F. S. DURE.
OVERCHECKING BIT FOR BRIDLES.
APPLICATION FILED JULY 18, 1907.
900,712.
Patented Oct. 13, 1908.
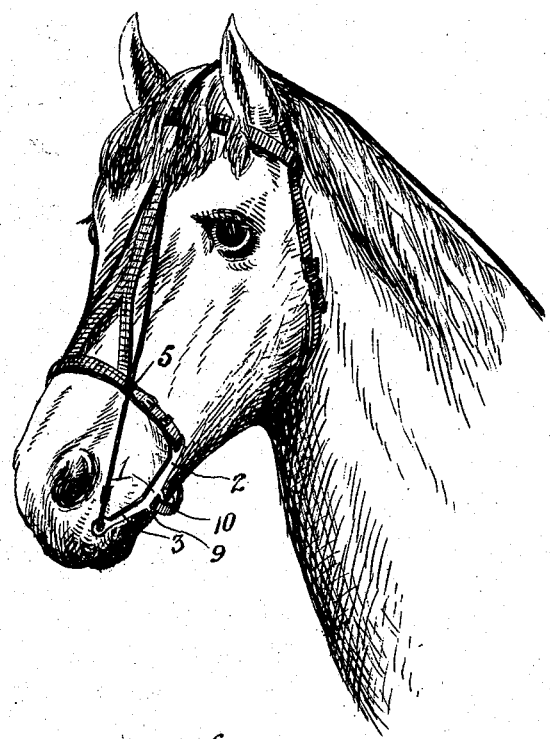
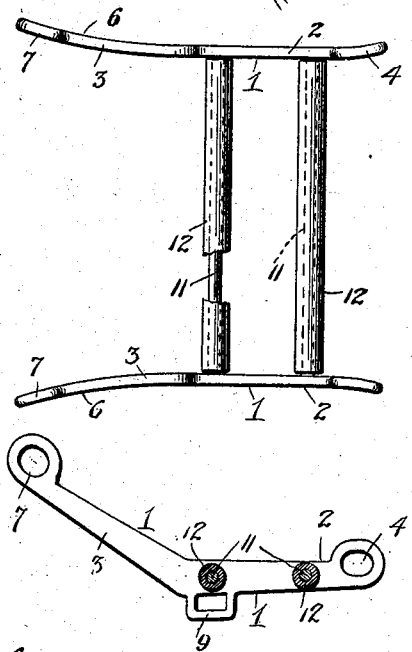
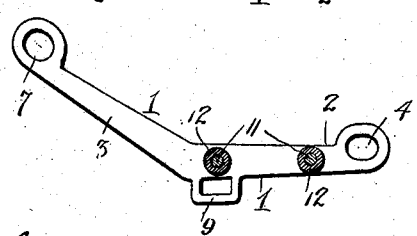
Witnesses
Chas. L. Griesbauer.
C. H. Griesbauer.
Inventor
F. S. Dure
by H. B. Willson & Co.
Attorneys

UNITED STATES PATENT OFFICE.

FRANK S. DURE, OF WILMINGTON, DELAWARE.

OVERCHECKING-BIT FOR BRIDLES.

No. 900,712.   Specification of Letters Patent.   Patented Oct. 13, 1908.

Application filed July 18, 1907. Serial No. 384,380.

*To all whom it may concern:*

Be it known that I, FRANK S. DURE, a citizen of the United States, residing at Wilmington, in the county of Newcastle and State of Delaware, have invented certain new and useful Improvements in Overchecking-Bits for Bridles; and I do declare the following to be a full, clear, and exact description of the invention, such as will enable others skilled in the art to which it appertains to make and use the same.

This invention has relation to new and useful improvements in overchecking bits for bridles and has for its main object the production of a simple, economical and durable bit of this character through the use of which a horse or other animal may be kept under perfect control at all times without chafing or otherwise injuring the mouth of the horse in the slightest degree.

With the foregoing and other objects in view which will appear as the nature of the invention is better understood, the invention consists in certain novel features of construction, combination and arrangement of parts as will be hereinafter fully described and claimed.

In the accompanying drawings, Figure 1 is a perspective view of a bit constructed in accordance with the invention, applied to the mouth of a horse; Fig. 2 is a plan view of the bit; and Fig. 3 is a central longitudinal sectional view.

As shown in the drawings and in accordance with the invention, the bit comprises two side bars 1 bent upward at a suitable angle at points intermediate of their lengths to provide rearwardly and forwardly extending members or portions 2 and 3 respectively. The rearwardly extending members or portions of said bars are preferably straight and are provided near their extreme outer ends with apertures or eyes 4 for receiving the ends of a nose strap 5 adapted to work over the nose of a horse. The outer or forward ends of said forwardly extending members are bent or flared outwardly as at 6 and are provided in their extreme front ends with apertures or eyes 7 adapted to receive the ends of the overdraw. Said rearwardly extending members or portions of said side bars are provided on their under edges near their inner ends or junction with said forwardly extending members with depending loops 9 adapted to receive the ends of a jaw strap adapted to work under the jaw of the animal to which the bit is applied. The side bars are connected together a suitable distance apart by two straight cross-bars 11 spaced a suitable distance apart and arranged between the rearwardly extending members thereof. Hollow tubes or rollers 12 preferably of hard rubber are journaled on said cross-bars and revolve or roll freely with a movement of the tongue of the horse or other animal to which the bit is applied and prevent the mouth of the animal becoming chafed or otherwise injured in the slightest degree.

From the foregoing description, taken in connection with the accompanying drawings, the construction and operation of the invention will be readily understood without requiring a more extended explanation.

Having thus described my invention, what I claim as new is:—

In a device of the class described, side members having upper and lower end loops, outer and inner spaced cross bars connecting said members, intermediate loops on said side members near the ends of said outer cross bar, a nose band connecting said upper loops, over checks passing upwardly from said lower loops and crossing the nose band, and a chin strap connecting said intermediate loops.

In testimony whereof I have hereunto set my hand in presence of two subscribing witnesses.

FRANK S. DURE.

Witnesses:
JAMES H. HANNA,
EDWARD W. CARROLL.